US005415923A

United States Patent [19]

Sarokin et al.

[11] Patent Number: 5,415,923

[45] Date of Patent: May 16, 1995

[54] PAINT MASKING MATERIAL COMPRISING A FIBROUS BASE COATED ON ONE SURFACE WITH A PAINT-PERMEABLE COATING AND COATED ON THE OTHER SURFACE WITH A PAINT-IMPERVIOUS COATING

[75] Inventors: Steven D. Sarokin, Green Bay, Wis.; John E. Dayton, Jr., Beaumont, Tex.

[73] Assignee: International Paper Company, Purchase, N.Y.

[21] Appl. No.: 676,749

[22] Filed: Mar. 28, 1991

[51] Int. Cl.$^{6}$ ........................ D21F 11/00; B32B 5/16; B32B 5/24; B32B 7/12

[52] U.S. Cl. .................................... 428/283; 162/135; 162/137; 428/284; 428/287; 428/311.1; 428/311.7; 428/318.4

[58] Field of Search ............... 428/212, 248, 246, 286, 428/288, 532, 509, 78, 40, 42, 533, 534, 535, 537.5, 283, 284, 287, 311.1, 311.7, 318.4; 106/139, 2; 427/352, 154; 162/135, 137

[56] References Cited

U.S. PATENT DOCUMENTS

| | | | |
|---|---|---|---|
| 1,683,453 | 9/1928 | Farrell . | |
| 1,723,581 | 8/1929 | Ruderman | 106/139 |
| 1,861,165 | 5/1932 | Ryan et al. | 106/2 |
| 2,082,791 | 6/1937 | Copeman | 280/152 |
| 2,803,557 | 8/1957 | Martin et al. | 427/208.4 |
| 3,152,921 | 10/1964 | Gallagher et al. | 428/167 |
| 3,846,172 | 11/1974 | Fossati | 427/352 |
| 4,010,307 | 3/1977 | Canard et al. | 524/25 |
| 4,012,543 | 3/1977 | Ranger et al. | 427/361 |
| 4,112,192 | 9/1978 | Vreeland | 428/511 |
| 4,187,219 | 2/1980 | Maher | 260/17.4 ST |
| 4,241,143 | 12/1980 | Ashie et al. | 428/512 |
| 4,265,969 | 5/1981 | Yasuda et al. | 428/342 |
| 4,279,964 | 7/1981 | Heller | 428/496 |
| 4,308,320 | 12/1981 | Schiller | 428/511 |
| 4,347,266 | 8/1982 | Norman et al. | 427/154 |
| 4,861,652 | 8/1989 | Lippert et al. | 428/286 |
| 4,921,740 | 5/1990 | Falconer et al. | 428/40 |
| 5,104,711 | 4/1992 | Marsek | 428/78 |

*Primary Examiner*—James D. Withers
*Attorney, Agent, or Firm*—Luedeka, Neely & Graham

[57] ABSTRACT

An improved masking material useful in spray-painting operations comprising an absorptive reservoir defined by a fibrous base sheet to one surface of which there is applied a first coating that defines a less than complete barrier to the transfer of paint to said base sheet and to the opposite surface of which there is applied a second coating that defines a substantially complete barrier to the strike-through of paint to an underlying surface sought to be protected from the paint.

5 Claims, 1 Drawing Sheet

Figure 1:
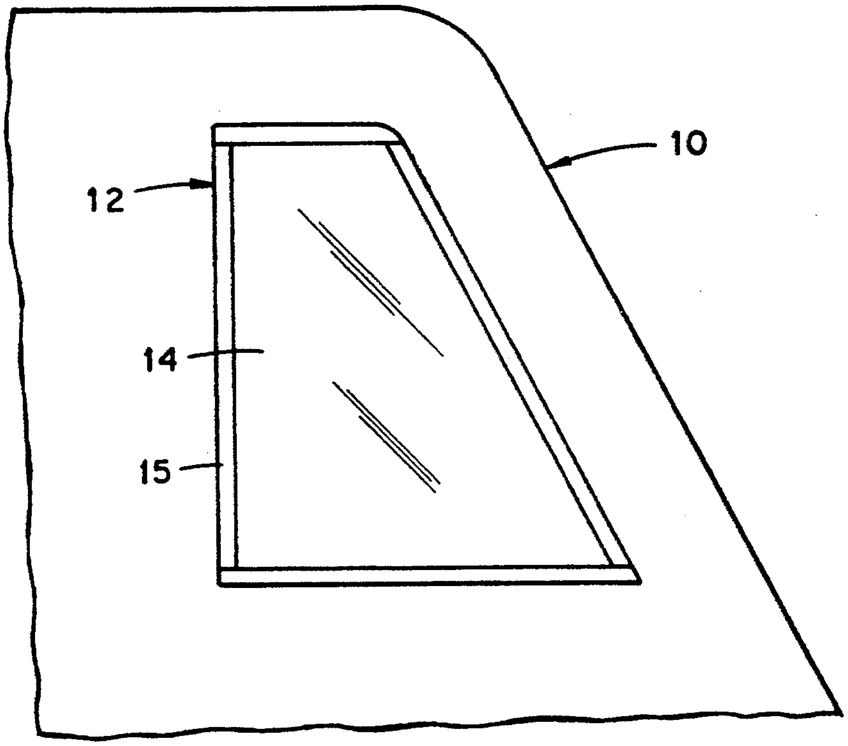

PAINT MASKING MATERIAL COMPRISING A FIBROUS BASE COATED ON ONE SURFACE WITH A PAINT-PERMEABLE COATING AND COATED ON THE OTHER SURFACE WITH A PAINT-IMPERVIOUS COATING

This invention relates to sheet or web material which is employed to cover and mask off an area of an object being spray painted to prevent the paint from contacting such covered area.

In the spray painting of objects, for example motor vehicles or portions thereof, it is commonly desired that certain area or areas of the object not receive the sprayed paint. To avoid such, the areas to be protected may be covered with a mask which is secured over the area to be protected from paint, as by means of edge taping, and which most usually remains in such position until the paint applied to the surrounding area is dry or cured, as the case may be. Thereafter the mask is removed, leaving the protected area free of paint. Stated generally, in the spray paint industry paints are referred to as acrylic enamels, acrylic lacquers and acrylic urethanes. End users of these paints commonly dilute the paint with solvent (xylene being the most aggressive) between about 35% to 65%.

In the prior art, newspaper, meat wrapping paper, thermoplastic sheets or webs, and like flat materials have been employed as masks. Several of these prior art materials are essentially impervious to the paint and/or to one or more of the components of the paint, such as the various solvents used in "oil-based" or in "latex" paints and therefore serve to prevent strike-through of the paint onto the surface underlying the mask. These materials, however, are not absorptive of the paint or its components so that the paint tends to accumulate on the material and eventually flow or drip from the mask onto the painted surface and thereby develop "runs" on the painted surface. Newspaper, while absorptive to a degree greater than thermoplastic sheet, for example, also tends to accumulate paint and develop "runs". Moreover, newspaper and certain other of the presently used mask materials tend to have loose fibers on their surfaces which during the spray painting operation are dislodged and blown onto the freshly painted surface and thereby destroying the finish of the painted surface. This problem is exacerbated when the mask is in place when the object to be painted is first subjected to wet sanding or the like in preparation for painting. Still further, thermoplastics and materials coated with low-temperature resistant coatings, such as meat wrapping papers, can not withstand the heat of curing of paint and tend to adhere to the underlying surface of the object being painted, thereby presenting a serious problem of their removal. These and certain other mask materials used heretofore further are relatively inflexible which creates difficulty in positioning the mask onto and securing the same to the object over the precise area from which the paint is to be excluded.

It is therefore an object of the present invention to provide an improved spray-painting masking material which overcomes the disadvantages of the prior art in that it is flexible, absorptive of the paint, and presents a barrier to the strike-through of the paint onto the underlying surface of the object. It is another object of the present invention to provide a masking material of the type described which is relatively inexpensive. It is another object to provide a masking material of the type described wherein defiberization of the material is substantially eliminated, even in the presence of wet sanding. It is another object to provide a masking material of the type described which is heat resistant and can be left in place during heat curing of the painted surface.

Figure 2:
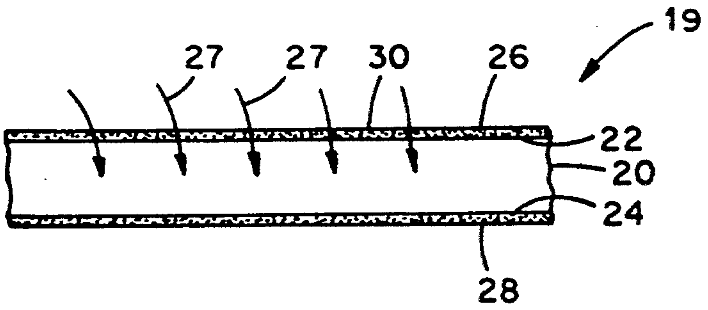

Further objects and advantages of the present invention will be recognized from the following description, including the drawings in which:

FIG. 1 is a cutaway representation of a portion of an object to be painted and which has applied thereto a masking material overlying an area which is to be protected from the paint; and FIG. 2 is a representation, in section, of a masking material embodying various of the features of the present invention.

In accordance with the present invention there is provided an improved masking material for use in protecting a selected area or areas of an object to be spray painted from the paint or one or more components of the paint. This improved masking material comprises a base sheet or web of a fibrous material such as cellulosic or other fibers which are absorptive of the paint and/or the components of the paint and provides a collection reservoir for the paint and/or its components that may be deposited thereon during a painting operation. This base sheet or web further includes on one of its flat surfaces a coating of a composition applied thereto in a manner and quantity which provides a partial barrier to the paint and/or its components, but which permits a major portion of such to penetrate such coating and be absorbed by the base. This coating further serves to bind the fibers of the base to the base and prevent their dislodgment in the course of preparing the object for painting (e.g. wet sanding), or in the course of the actual painting and/or curing operations.

The present improved masking material further includes on the second of its flat surfaces a further and different coating which is of a nature as to define a substantially complete barrier to the strike-through of paint and/or the components of the paint from the base sheet onto the protected surface underlying the mask. This latter coating comprises a combination of pigment-type matter, such as clay, and a binder that is heat resistant. Each of the coatings applied to the opposite flat surfaces of the base are of a nature such that the completed masking material is sufficiently flexible to be readily positioned and secured to the object in overlying relationship to the area or areas to be protected from the paint.

For purposes of the present discussion, the term "sheet" is to be deemed in include a discrete sheet and a continuous web unless otherwise indicated to the contrary.

With reference to the Figures, in FIG. 1 there is depicted a portion of a motor vehicle door 10 including a window 12 provided therein. As depicted, the door and window are prepared for spray painting by the placement of a mask 14 in position overlying the window 12 and held in place as by tape 15. Thereafter both the door and the covered window are sprayed with paint so that the mask receives an application of paint which is substantially of the same quantity per unit area as that applied to the door itself. Often multiple coatings of paint are applied with sanding or other surface treatment of the painted surface between coats.

Referring to FIG. 2, a masking material 19 in accordance with the present invention comprises a base sheet 20 having first and second flat opposite surfaces 22 and 24, respectively. As depicted, the first surface 22 has applied thereto a first coating 26 and the second surface 24 has applied thereto a second coating 28. As referred to hereinabove and as will be further discussed hereinafter, the first coating defines less than a complete barrier to the flow of paint therethrough and into the base sheet, while the second coating defines a substantially complete barrier to the passage of paint from the base sheet to the underlying protected surface, e.g. the window 12. Recalling also that the base sheet comprises absorbent fibrous matter, it will be recognized that when any cut edges of the masking material are taped closed, the coatings and base sheet define a capture reservoir for paint and/or components of the paint. As indicated by the several arrows 27 leading through the coating 26 of FIG. 2, a major portion of the paint received by the masking material passes through the first coating 26 and is captured interiorly of the base sheet 20 thereby preventing accumulation of such quantities of paint on the exposed surface 30 of the coating 26 as would permit the flow of such paint from the masking material and onto the unprotected areas of the object being painted.

A base sheet 20 of the present invention may be formed of any suitable material that will absorb paints. Preferred absorbent materials are cellulosic or polyester fibers, or combinations thereof. Most preferred are cellulosic fibers such as those obtained from wood. The base sheet may be formed by conventional papermaking methods and employing conventional papermaking machines. Nonfibrous materials have been found to not take up the paint as required, presumably due to their absorbency properties and/or their inability to define capillary-like channels for absorbing the paint within a time period sufficient to prevent the undesired accumulation of the paint on the exposed surface of the masking material. One suitable base sheet comprises cellulosic kraft pulp formed on a Fourdrinier papermaking machine and subsequently dried to provide a cellulosic sheet having a basis weight of between about 10 and about 50 lb/3000 $ft^2$.

The base sheet 20 of the present invention has applied to its first surface 22 a sizing composition to develop a first coating 26 which defines a less than complete barrier to the passage of paint and/or one or more of the components of the paint therethrough. Preferably such coating 26 comprises a sizing composition including a starch and a binder water/solvent repellent. Either corn or potato starch have been found suitable for this application, with corn starch being preferred because of its economic advantage. The binder water repellent (hereinafter referred to at times only as a "binder") may include any of the known polymeric binders employed in papermaking in combination with starch, such binders including latices such as vinyl acetates, vinyl acrylics, styrene butadiene, or acetate acrylics. In any event, the preferred binder is resistive to degradation by the common solvents found in paints so that the coating is not materially degraded by the paint sprayed thereon and which flows therethrough into the absorptive reservoir of the present masking material. Further, the binder preferably is compatible with the fibrous content of the base sheet such that when applied to the surface of the base sheet, the binder and starch further serve to bond at least those fibers adjacent the surface of the base sheet to one another and/or to the binder itself to thereby prevent such fibers from becoming dislodged from the base sheet. Still further it has been found that the binder must impart a degree of water and/or solvent repellency to the starch in order to develop the desired partial barrier characteristics of the first coating.

Further, the present masking material includes a second coating 28 applied to the second surface 24 of the base sheet 20. Such second coating defines a substantially complete barrier to the passage of paint therethrough and comprises a relatively inert filler such as clay combined with a polymeric binder. Fillers such as kaolin, silica, titanium dioxide and other like fillers may be substituted for or used in combination with clay. A suitable binder comprises a styrene/butadiene composition in which the styrene comprises between about 10% and about 90% of the solids content. Employing a styrene/butadiene binder, a preferred composition for the second coating comprises between about 10 to about 80 parts by weight of delaminated clay (available from Engelhard Clay) in combination with between about 10 and about 90 parts by weight of No. 4 clay (65% $<2$ microns) available from Georgia Kaolin. The clays function as fillers and to impart a white color to the second coating thereby making the second coating recognizable visually by the end user. For those applications of the masking material where the mask is to remain in position during a heat curing operation for the paint, the composition of such second coating is selected to withstand the elevated temperature of the curing operation, e.g. 200°-300° F. The above noted preferred coating composition will withstand such curing temperatures without material degradation of the masking material such that the masking material tends to adhere to the underlying protected surface. A coating composition having between about 20 and about 80% by weight solids content, when applied to the base sheet in a quantity of between about 3 and about 10 lbs. per 3,000 $ft^2$ of base sheet surface has been found to provide a coating which defines a substantially complete barrier to either oil or latex-based paints. It will be recognized that for a given base sheet reducing the solids content of the coating composition will reduce the porosity of the applied coating, as will the application of lesser quantities of the overall composition to the sheet. Thus, one needs to select from the stated range that combination of solids content and total quantity of applied coating as will achieve the desired porosity.

The first coating 26 may be readily applied to the base sheet employing a conventional size press of the type well known in the papermaking industry. The first coating may be dried before the second coating is applied, or if desired, the second coating may be applied to the opposite surface of the base sheet before the product is dried.

The second coating for the base sheet of the present invention may be applied by any of several conventional coating processes and using conventional apparatus that is well-known in the paper industry. One suitable apparatus is a short dwell blade coater available from a variety of suppliers including Beloit Corporation. In the application of the coating using a blade coater apparatus, the base sheet is fed forwardly as by a set of feed rolls to a station at which the coating composition is flowed onto the upper surface of the base sheet and thereafter passed under a blade which serves to spread the coating onto the surface in a coating of a thickness that is established by the gap between the blade and the sheet surface. After application, the coating is dried and the product collected either in sheet or web form. Preferably, one of the first and second coatings is applied and dried before the other of the coatings is applied to the base sheet, but it is permissible to apply the coatings simultaneously by processes well-known in the art. Following application of the first and second coatings and after they are dried, the coated sheet preferably is calendered, preferably employing two sets of nip rolls set at 700/700 pli minimum pressure at ambient (room) temperature to enhance the coating bonds and the smoothness of the surfaces of the coated sheets.

A specific example of a first coating composition for application to a fibrous base sheet is given in the following Example I:

EXAMPLE I

| | |
|---|---|
| Starch | 2000 lb |
| Binder | 29 gal |
| Defoamer | 1 qt |
| Water | 500 gal |

In a preferred procedure the starch is cooked at about 200° F. in the water as is known in the papermaking industry. The cooked starch is cooled and the binder water/solvent repellent is added. Defoamer is added as needed. It has been found that the desired partial barrier characteristics of the first coating may be developed by selecting the "hold-out" of such first coating. This is accomplished by means of a binder which also imparts water and paint-solvent repellency to the first coating. A preferred such binder/water repellent is a proprietary composition sold by Bercen, Inc. under the tradename Berbond 8032. This composition is said to be a "fluorochemical extender" designed for use as a water repellent for paper and paperboard. It has been found to be compatible with xylene which is one of the more aggressive solvents employed in spray painting, and to water.

A specific example of a second coating composition for application to the opposite surface of the same fibrous base sheet is given in Example II.

EXAMPLE II

| | |
|---|---|
| Delaminated clay | 50 parts |
| No. 4 clay | 50 parts |
| Dispersant | .06% on pigment |
| Water Holding Agent | 0.2% on pigment |
| Defoamer | 0.1% on pigment |
| Styrene/Butadiene Binder | 16 to 20 parts |
| Lubricant | 1% on pigment |
| Ammonia | to pH 8.0 ± 0.5 |
| Water | to 62% solids |

The composition of Example I results in about 1000 gals of the coating composition in which there is a solids content of about 62%. The resultant pH of the composition is about 8. In the composition of Example II, the delaminated and No. 4 clays when bound with the styrene/butadiene binder and applied to the base sheet serve to define an essentially complete barrier to the passage of paint or paint components, such as a solvent, through the thickness of the coated base sheet. Enhancement of these clays (pigment) within the composition is by means of the dispersant. Viscosity control is aided by means of the water holding agent. Defoamer and a lubricant (for coating blade protection) are added as desired. These components of the coating composition which are supplementary to the clay/binder complex are known in the papermaking industry.

A masking material manufactured employing cellulosic fibers formed into a base sheet having a basis weight of about 25.5 lb/3000 $ft^2$ was coated, employing a blade coater, with first and second coatings as per the compositions set forth in Examples I and II. The first coating was applied to a first surface of the base sheet in a quantity of 0.2 to 2.0 lb/3000 $ft^2$ of such surface area. The second coating was applied to the opposite surface of the base sheet, which in this example was the machine-glazed surface of a paper web dried on a Yankee dryer, in a quantity of 6.5 lb/3000 $ft^2$ of such opposite surface. The coated sheet was calendered employing two sets of nip rolls set at 700/700 pli minimum pressure and at ambient (room) temperature. The resultant masking material had an average thickness of about 2.1 mils. It exhibited good conformity to non-flat surfaces and had a tensile strength of 25 lbs in the machine direction and about 13 lb in the cross machine direction, and a tear strength of about 26 lbs in the machine direction and about 32 lbs in the cross machine direction. The masking material was affixed to a portion of a metal surface by taping the edges of a sheet of the masking material to such surface employing conventional masking tape and the unprotected and masked portions of the metal were sprayed with a xylene-containing paint using conventional spray-painting equipment. Other like metal surfaces were prepared and sprayed in like manner, but with oil-based paint. In each instance, that portion of the paint which was applied to the masked area was absorbed interiorly of the masking material as was observed by removing the masking material and tearing the same along its planar dimension to reveal the interior of the capture reservoir of the masking material and the paint contained therein. There was no accumulation of paint on the exposed surface of the masking material such as resulted in flow of such paint off the masking material. No paint nor component of the paint was observed to strike through the masking material and onto that metal surface underlying the masking material.

Similar samples of the masking material on metal surfaces were subjected to wet sanding operations representing such pre-painting procedures as are commonly employed. The present masking material not only withstood the abrading forces of the sanding, but also captured the liquid carrier for the sand as such came into contact with the masking material. Further, the first coating of the present masking material protected the fibrous material of the base sheet to the extent that no loose fibers were observable on the masking material following the sanding operation.

Samples of the masking paper prepared in accordance with the present invention and comparison samples were subjected to a "direct xylene" test. In accordance with this test, an $8\frac{1}{2}\times 11$ inches sheet of the masking material is crumpled by hand into a 3" diameter "ball". The sheet is then gently smoothed to lay flat. Blotter paper (similar to that used in a standard Cobb test procedure) is attached as by tape to the clay-coated (second) surface of the sheet. A solution comprising Victoria blue dye (8 gm/gal of xylene) and xylene is prepared and 5 ml of this solution is poured onto the first, i.e. non-clay coated surface of the sheet and allowed to remain undisturbed for five minutes. Thereupon, the excess solution is poured off the sheet and the sheet is examined visually for visible staining. Visual observation of any colored solution absorbed onto the blotter indicates failure of the sheet to meet the requirement of no-strike through of the paint through the thickness of the second coated surface of the masking material.

Further, samples of masking material manufactured in accordance with the present invention and comparison samples were subjected to the 3-M Kit Test. In this test, several drops of 3-M Kit solution #5 (containing 120 parts castor oil, 40 parts toluene, and 40 parts heptane) were applied to the first coated surface of the samples. If the test solution absorbs smoothly into the paper, the masking material is deemed to possess no material hold-out property and is rejectable. Observation of absorption is to be made within thirty seconds following application of the solution to the masking material.

Results of "xylene" and "3-M Kit" testing of masking material manufactured using different coating compositions, or no coating, are presented in Table I.

TABLE I

| Sample No. | Identification |
|---|---|
| 1 | D220 starch (simple pearl starch, low viscosity) |
| 2 | D220 with Berset 2586 (melamine formaldehyde starch crosslinker) |
| 3 | D220 with Berbond 8032 (proprietary latex emulsion manufactured by Bercen Inc.) |
| 4 | Salmon MF from Mosinee Paper (not coated) |
| 5 | Thilmany Salmon 30# (not coated) |
| 6 | 3M gold (poly backed - one side) |
| 7 | 30# Green Longview (not coated) |

| Sample | 3-M Kit Test | Direct Xylene Test |
|---|---|---|
| 1 | Pass | Fail |
| 2 | Not done | Poor |
| 3 | Pass | Pass |
| 4 | Both sides pass | Not done |
| 5 | Both sides pass | Not done |
| 6 | Back side fails | Not done |
| | Poly side passed | — |
| 7 | Both sides fail | Not done |

Like samples of the present masking material were also tested for porosity using the standard Sheffield porosity tester (1½ platen). Such tests showed that coated masking material made in accordance with the present disclosure and which exhibited Sheffield porosity values of less than about 20 were ineffective in preventing the strike-through of paint or its components to a masked surface. In general, acceptable masking material is taken to be that which passes the 3-M Kit Test, the xylene test and the Sheffield porosity test.

What is claimed is:

1. An improved masking material for use in spray painting operations for overlying and protecting one or more selected areas against receiving paint consisting essentially of:

a base sheet of absorbent fibers having first and second opposite flat surfaces and a basis weight of between about 10 and about 50 lb/3000 ft$^2$;

a first coating applied to said first surface of said sheet, said first coating being adapted to be exposed to paint when said masking material is disposed in overlying relationship to a protected area during a spray painting operation and constituting less than a complete barrier to the transport of paint therethrough to said base sheet and serving to bind said absorbent fibers against dislodgment thereof during a spray painting operation, the first coating including starch and a water and solvent repellent binder;

a second coating applied to said second surface of said sheet in a quantity of from about 3 to about 10 lbs/3000 ft$^2$ of said second surface, said second coating being adapted to face a protected area when said masking material is disposed in overlying relationship to such protected area and constituting a substantially complete barrier to the strike-through of paint from said base sheet to the underlying protected area, the second coating including a substance selected from the group consisting of clay, kaolin, silica, titanium dioxide, and mixtures thereof, combined with a latex binder; and the absorptivity of said base sheet being sufficient to provide for the retention by said masking material of at least one application of a sprayed paint without accumulation on said first coating surface of sufficient paint as will permit the flow of such paint from said masking material.

2. The masking material of claim 1 wherein said second coating is sufficiently heat resistant as prevents the destruction of said coating during a paint curing operation and prevents said masking material from adhering to the underlying protected area.

3. The masking material of claim 1 wherein said first coating is applied to said first surface in a quantity of between about 0.2 and about 2.0 lb of coating composition per 3,000 square feet of said first surface.

4. The masking material of claim 1 wherein said second coating is applied to said second surface in a quantity of between about 3.5 lb and about 10 lb per 3,000 ft$^2$ of said second surface.

5. The masking material of claim 1 wherein said absorbent fibers are selected from the group consisting of cellulose, polyester and combinations thereof.

* * * * *